(12) United States Patent
Son

(10) Patent No.: US 9,470,921 B2
(45) Date of Patent: Oct. 18, 2016

(54) DISPLAY DEVICE

(71) Applicant: Samsung Display Co., Ltd., Yongin (KR)

(72) Inventor: JunHee Son, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 56 days.

(21) Appl. No.: 14/464,807

(22) Filed: Aug. 21, 2014

(65) Prior Publication Data

US 2015/0219955 A1    Aug. 6, 2015

(30) Foreign Application Priority Data

Feb. 4, 2014  (KR) .................. 10-2014-0012719

(51) Int. Cl.
*G02F 1/1333*    (2006.01)
*G02F 1/1335*    (2006.01)
*F21V 8/00*    (2006.01)

(52) U.S. Cl.
CPC ....... *G02F 1/133308* (2013.01); *G02B 6/0023* (2013.01); *G02B 6/0031* (2013.01); *G02F 1/133615* (2013.01); *G02F 2001/133314* (2013.01); *G02F 2001/133317* (2013.01); *G02F 2201/465* (2013.01)

(58) Field of Classification Search
CPC .................. G02F 1/133308; G02F 2201/465; G02F 2001/133317; G02F 2001/133314; G02F 1/133615; G02B 6/0023; G02B 6/0031
See application file for complete search history.

(56) References Cited

U.S. PATENT DOCUMENTS

| | | | |
|---|---|---|---|
| 5,729,310 A * | 3/1998 | Horiuchi | G02B 6/0088 349/58 |
| 8,350,987 B2 | 1/2013 | Yang et al. | |
| 2002/0001184 A1* | 1/2002 | Kim | G02B 6/0031 362/633 |
| 2007/0002206 A1* | 1/2007 | Shirai | G02F 1/133308 349/58 |
| 2011/0032447 A1 | 2/2011 | Park et al. | |
| 2011/0141391 A1* | 6/2011 | Kim | G02B 6/0093 349/61 |
| 2011/0260960 A1 | 10/2011 | Jean et al. | |
| 2011/0261282 A1* | 10/2011 | Jean | G02F 1/133308 349/58 |
| 2011/0261283 A1 | 10/2011 | Kim et al. | |
| 2012/0169958 A1 | 7/2012 | Lee et al. | |
| 2012/0212966 A1* | 8/2012 | Wang | G02F 1/133308 362/362 |
| 2013/0027857 A1 | 1/2013 | Jeong | |
| 2014/0043560 A1* | 2/2014 | Jang | H05K 5/02 349/58 |

FOREIGN PATENT DOCUMENTS

| | | |
|---|---|---|
| KR | 1020080067744 | 7/2008 |
| KR | 1020120000873 | 1/2012 |
| KR | 1020120005872 | 1/2012 |
| KR | 1020120072958 | 7/2012 |
| KR | 1020130027204 | 3/2013 |

* cited by examiner

*Primary Examiner* — Paul Lee
*Assistant Examiner* — Jia Pan
(74) *Attorney, Agent, or Firm* — H.C. Park & Associates, PLC

(57) ABSTRACT

A display device includes a display panel, a backlight unit that provides a light to the display panel, a bottom cover that accommodates a portion of the backlight unit, and a chassis frame coupled to the bottom cover and supporting the display panel.

10 Claims, 3 Drawing Sheets

DISPLAY DEVICE

CROSS-REFERENCE TO RELATED APPLICATION

This U.S. non-provisional patent application claims priority from and the benefit of Korean Patent Application No. 10-2014-0012719, filed on Feb. 4, 2014, the contents of which are hereby incorporated by reference in its entirety.

BACKGROUND

1. Field

Exemplary embodiments of the present disclosure relate to a display device.

2. Discussion of the Background

Various display devices, such as a liquid crystal display (LCD) device, a plasma display device, a field emission display (FED) device, a light emitting diode (LED) display device, an organic light emitting diode (OLED) display device, etc., have been widely used as flat panel display devices.

Among them, the liquid crystal display device has been widely applied to various fields since it has many desirable properties, including advanced development of mass production techniques, ease of driving, low power consumption, thin thickness, high-definition display quality, and large-sized display screen.

SUMMARY

Exemplary embodiments of the present disclosure provide a display device having reduced thickness.

Additional features of the invention will be set forth in the description which follows, and in part will be apparent from the description, or may be learned by practice of the invention.

Exemplary embodiments of the inventive concept provide a display device including a display panel, a backlight unit that provides a light to the display panel, a bottom cover that accommodates a portion of the backlight unit, and a chassis frame coupled to the bottom cover to support the display panel. The chassis frame includes a first portion that surrounds an outer portion of the bottom cover and covers the portion of the backlight unit, and a second portion that extends from the first portion, on which the display panel is placed.

According to the above, the thickness of the display device may be reduced since the display device does not include additional top chassis. Therefore, manufacturing costs of the display device may be decreased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other advantages of the present disclosure will become readily apparent by reference to the following detailed description when considered in conjunction with the accompanying drawings.

DETAILED DESCRIPTION OF THE ILLUSTRATED EMBODIMENTS

Figure 1:
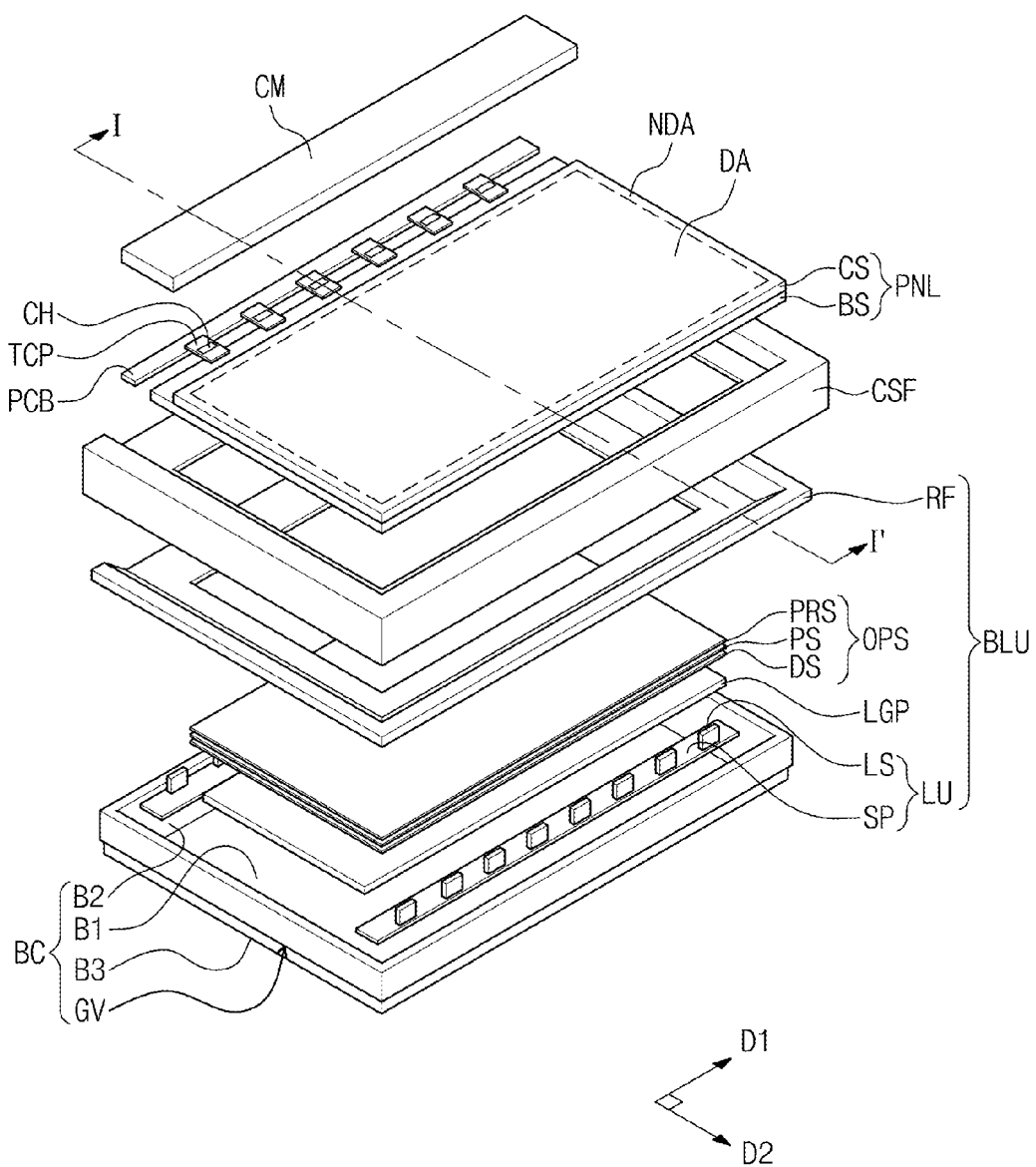
FIG. 1 is an exploded perspective view showing a display device according to an exemplary embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
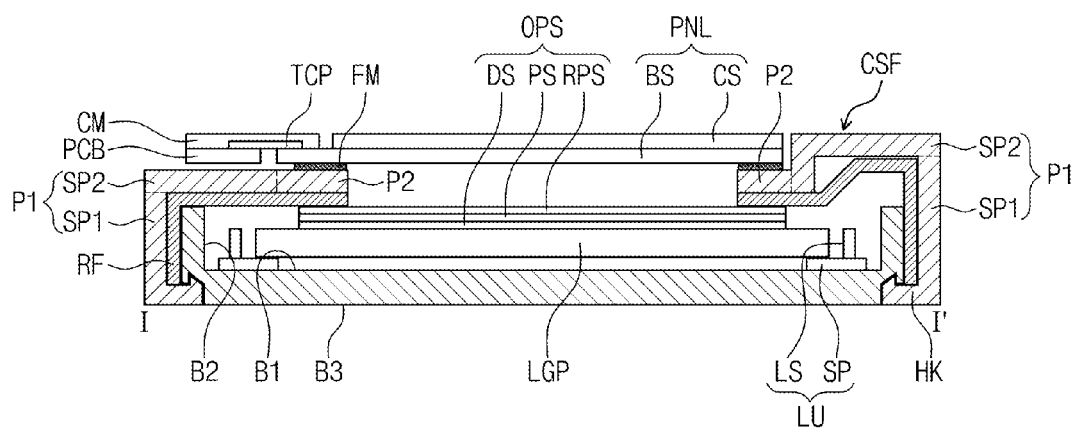
FIG. 2 is a cross-sectional view taken along a line I-I' shown in FIG. 1.

FIG. 1 is an exploded perspective view showing a display device according to an exemplary embodiment of the present disclosure and FIG. 2 is a cross-sectional view taken along a line I-I' shown in FIG. 1.

Referring to FIGS. 1 and 2, the display device includes a display panel PNL, a bottom cover BC, a backlight unit BLU, and a chassis frame CSF. In the present exemplary embodiment, for the convenience of explanation, a direction in which an image is displayed on the display panel PNL viewable by a user will be referred to as an upward direction or a front direction, and a direction opposite to the upward direction will be referred to as a downward direction or a rear direction, but they should not be limited thereto or thereby.

The display panel PNL displays the image. The display panel PNL is not-self emissive. Thus, various types of display panels, such as a liquid crystal display panel, an electrowetting display panel, an electrophoretic display panel, a microelectromechanical system (MEMS) display panel, etc., may be used as the display panel PNL.

However, the display panel PNL should not be limited thereto or thereby. For instance, an organic electroluminescent display panel or a plasma display panel may be used as the display panel PNL. Since the organic electroluminescent display panel or the plasma display panel used as display panel PNL is self-emissive, the backlight unit BLU may be omitted from the display device in those cases. For the sake of convenience, in the present exemplary embodiment, the liquid crystal display panel will be described as the display panel PNL.

The display panel PNL has a rectangular plate shape with two pairs of opposing sides. Among the two pairs of the sides, one pair of the sides is longer than the other pair of the sides. Here, a direction in which long sides of the display panel PNL extend is referred to as a first direction D1 and short sides of the display panel PNL extend is referred to as a second direction D2.

The display panel PNL includes a display area DA, in which the image is displayed, and a non-display area NDA, which is disposed in an area that does not include the display area DA.

The display panel PNL includes a base substrate BS, an opposite substrate CS facing the base substrate BS, and a liquid crystal layer (not shown) disposed between the base substrate BS and the opposite substrate CS.

The base substrate BS includes a plurality of pixel electrodes (not shown) and a plurality of thin film transistors (not shown) electrically connected to the pixel electrodes in a one-to-one correspondence. Each thin film transistor is a switch for a driving signal applied to the corresponding pixel electrode. In addition, the opposite substrate CS includes a common electrode (not shown) that forms an electric field in cooperation with the pixel electrodes in order to control an arrangement of liquid crystal molecules of the liquid crystal layer. The display panel PNL drives the liquid crystal molecules of the liquid crystal layer to allow the image to be displayed in the front direction.

The display device further includes a driving chip CH that outputs the driving signal, a tape carrier package TCP on which the driving chip CH is mounted, and a printed circuit board PCB electrically connected to the display panel PNL through the tape carrier package TCP. As shown in FIG. 1, the printed circuit board PCB extends in the first direction along a side of the display panel PNL. The printed circuit board PCB is positioned at the same plane as the display panel PNL, but it should not be limited thereto or thereby. In the present exemplary embodiment, one printed circuit board PCB is provided, but the number of the printed circuit board PCB should not be limited to one. That is, the display device may include plural printed circuit boards disposed at different positions. The printed circuit board PCB is disposed on an upper surface of the chassis frame CSF. In this case, the tape carrier package TCP may be bent along the upper surface of the chassis frame CSF.

The driving chip CH may generate the driving signal in response to an external signal in order to drive the display panel PNL. The external signal may be provided from the printed circuit board PCB and may include an image signal, various control signals, a driving voltage signal, etc.

The display device further includes a cover member CM disposed on the printed circuit board PCB covering the driving chip CH, the tape carrier package TCP, and the printed circuit board PCB. The cover member CM may protect the driving chip CH, the tape carrier package TCP, and the printed circuit board PCB.

The bottom cover BC is disposed under the display panel PNL to accommodate a portion of the backlight unit BLU.

The bottom cover BC includes a bottom surface B1 facing the display panel PNL, a sidewall portion B2 extending upward from the bottom surface B1, and a rear surface B3 opposite to the bottom surface B1. The bottom cover BC further includes a groove GV formed along at least one side of the bottom cover BC.

The backlight unit BLU is disposed between the display panel PNL and the bottom cover BC to provide a light to the display panel PNL. The backlight unit BLU includes a light source unit LU including light sources LS to emit the light, a light guide plate LGP to guide the light to the display panel PNL, at least one optical sheet OPS to improve an efficiency of the light, and a reflection part RF to reflect the light.

The light source unit LU includes the light sources LS and a support part SP to support the light source LS. The support part SP may be a printed circuit board, on which wires that apply and control a source voltage to the light sources LS are printed, and have a rectangular plate shape extending in one direction. The light source unit LU may be provided in a plural number.

The light source unit LU is disposed to be adjacent to the light guide plate LGP. The light emitted from the light sources LS is incident to the light guide plate LGP. The light guide plate LGP is accommodated on the bottom surface B1 and guides the light provided from the light sources LS to the display panel PNL. The light source unit LU is provided along at least one side of the display panel PNL.

In the present exemplary embodiment, two light source units LU are disposed along the long sides of the display panel PNL and spaced apart from each other in the second direction D2.

Each light source LS may be, but are not limited to, a point light source, a line light source, or a surface light source. As an example, the point light source, e.g., a light emitting diode, will be described as the light source LS. The light emitting diode is provided in a plural number and the light emitting diodes are arranged in a line on the support part SP. Here, the light source LS means a minimum light emitting unit, which is able to individually control an amount of the light emitted therefrom. Thus, one light source is configured to include one light emitting diode or plural light emitting diodes of which the brightness of the light emitting diodes is substantially simultaneously controlled. In the present exemplary embodiment, the light source unit LU includes the support part SP and the light sources LS, but it should not be limited thereto or thereby. That is, the support part SP may be omitted. In this case, a separate supporting member to support the light sources LS and/or separate wirings to apply the source voltage to the light sources are prepared.

The support part SP includes a light source controller (not shown) connected to the light source LS. The light source controller analyzes the image displayed on the display panel PNL to output a local dimming signal and to individually control a brightness of each light source LS in response to the local dimming signal. The light source controller may be mounted on a separate circuit board, but the position of the light source controller should not be limited to the separate circuit board.

The optical sheet OPS is disposed between the light guide plate LGP and the display panel PNL to control the light emitted from the light source LS. The optical sheet OPS includes a diffusion sheet DS, a prism sheet PS, and a protective sheet PRS.

The diffusion sheet DS diffuses the light. The prism sheet PS condenses the light diffused by the diffusion sheet DS to allow the light exiting from the diffusion sheet DS to travel in a direction substantially vertical to the display panel PNL. The light exiting from the prism sheet PS is vertically incident into the display panel PNL. The protective sheet PRS is disposed on the prism sheet PS to protect the prism sheet PS from external impacts. In the present exemplary embodiment, the optical sheets OPS are configured to include one diffusion sheet DS, one prism sheet PS, and one protective sheet PRS, but they should not be limited thereto or thereby. That is, at least one of the diffusion sheet DS, the prism sheet PS, and the protective sheet PRS of the optical sheets OPS may be provided in plural number, or one or more of the diffusion sheet DS, the prism sheet PS, and the protective sheet PRS may be omitted from the optical sheets OPS. In addition, the stack order of the diffusion sheet DS, the prism sheet PS, and the protective sheet PRS may be changed.

The reflection part RF reflects the light without being directed to the display panel PNL to allow the light to travel to the display panel PNL. As a result, the amount of the light traveling to the display panel PNL is increased by the reflection part RF.

The reflection part RF is disposed between the display panel PNL and the optical sheet OPS. The reflection part RF surrounds an outer portion of the bottom cover BC and covers a portion of the light source unit LU, the light guide plate LGP, and the optical sheet OPS. In the present exemplary embodiment, the reflection part RF is provided along an edge of the display panel PNL. The reflection part RF is disposed to overlap with the non-display area NDA.

The reflection part RF may be disposed at positions corresponding to four sides of the display panel PNL or disposed along at least one side of the display panel PNL to correspond to the light source unit LU. However, the position of the reflection part RF should not be limited thereto or thereby, and the reflection part RF may be disposed between the light guide plate LGP and the bottom cover BC.

The reflection part RF has a rectangular ring shape to correspond to the four sides of the display panel PNL or may have a laid-U shape to correspond to three sides of the display panel PNL. The reflection part RF may be integrally formed as a single unitary and individual unit or formed in plural parts. The reflection part RF may include a reflective material, e.g., aluminum (Al).

According to another embodiment, the light guide plate LGP may be omitted from the backlight unit BLU. In this case, the light source units may be disposed to overlap with the display area of the display panel. In more detail, the backlight unit BLU according to the present exemplary embodiment is an edge-illumination type backlight unit BLU in which the light source units LU are disposed at a side portion of a rear of the display panel to be adjacent to a side of the display panel PNL. However, the backlight unit according to another embodiment may be a direct-illumination type backlight unit in which the light source units are disposes over the entire surface of the rear of the display panel. The light source units are spaced apart from each other at regular intervals. In addition, a diffusion part may be further disposed between the display panel and the light source units to diffuse the light.

The chassis frame CSF is disposed between the display panel PNL and the backlight unit BLU.

The chassis frame CSF is coupled to the bottom cover BC and supports the display panel PNL. The chassis frame CSF surrounds the outer portion of the bottom cover BC and covers a portion of the backlight unit BLU.

The chassis frame CSF is provided to the four sides of the display panel PNL or at least one of the four sides of the display panel PNL. In detail, the chassis frame CSF has a rectangular ring shape to correspond to the four sides of the display panel PNL or may have a laid-U shape to correspond to three sides of the display panel PNL. The chassis frame CSF may be integrally formed as a single unitary and individual unit or formed in plural parts. The chassis frame CSF may include an organic material, e.g., a polymer resin.

The chassis frame CSF includes a first portion P1 that surrounds the outer portion of the bottom cover BC and covers the portion of the backlight unit BLU and a second portion P2 extending from the first portion P1. The display panel PNL is placed on the second portion P2.

The first portion P1 includes a first sub-portion SP1 disposed on the sidewall portion B2 and a second sub-portion SP2 extending and bent from the first sub-portion P1 to cover the portion of the backlight unit BLU. The chassis frame CSF further includes a hook HK formed at one end of the first sub-portion SP1. The hook HK is engaged with the groove GV of the bottom cover BC to assemble the chassis frame CSF to the bottom cover BC.

The printed circuit board PCB is disposed on the first portion P1. In the present exemplary embodiment, the printed circuit board PCB is disposed on the second sub-portion SP2, but it should not be limited thereto or thereby. That is, the printed circuit board PCB may be bent to be disposed on the first and second sub-portions SP1 and SP2.

In the present exemplary embodiment, the chassis frame CSF is assembled to the bottom cover BC by engaging the hook HK with the groove GV, but it should not be limited thereto or thereby. Although not shown in figures, the display device may further include a coupling member (not shown) to assemble the bottom cover BC and the chassis frame CSF after penetrating through the sidewall portion B2 and the first sub-portion SP1.

The display device further includes a fixing member FM disposed between the display panel PNL and the second portion P2 to couple the display panel PNL and the chassis frame CSF. The fixing member FM includes a material having an adhesive force, e.g., an adhesive tape.

Figure 3:
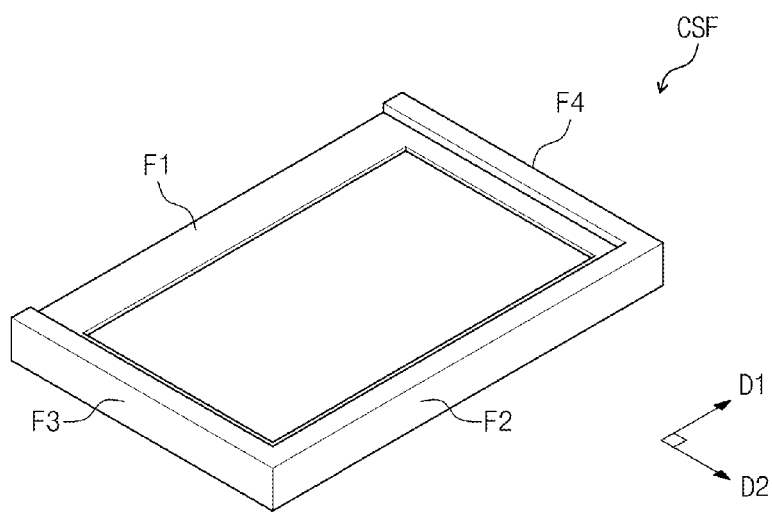
FIG. 3 is a perspective view showing a chassis frame according to an exemplary embodiment of the present disclosure.

FIG. 3 is a perspective view showing the chassis frame according to an exemplary embodiment of the present disclosure. Hereinafter, the chassis frame CSF will be described in detail with reference to FIGS. 1 to 3.

In the present exemplary embodiment, the chassis frame CSF has a rectangular shape corresponding to the edge of the display panel PNL.

The chassis frame CSF includes first, second, third, and fourth frames F1, F2, F3, and F4, respectively. The first and second frames F1 and F2 extend in the first direction D1 and are spaced apart from each other in the second direction D2 and correspond to the long sides of the display panel PNL in a one-to-one correspondence. The third and fourth frames F3 and F4 extend in the second direction D2 and are spaced apart from each other in the first direction D1 and correspond to the short sides of the display panel PNL in a one-to-one correspondence. Each of the first, second, third, and fourth frames F1, F2, F3, and F4 is connected to one or the other end of each adjacent frame to form a rectangle shape.

Each of the first, second, third, and fourth frames F1, F2, F3, and F4 includes the first portion P1 that surrounds the outer portion of the bottom cover BC and covers the portion of the backlight unit BLU and a second portion P2 extending from the first portion P1, on which the display panel PNL is placed.

The first portion P1 includes the first sub-portion SP1 and the second sub-portion SP2. The first sub-portion SP1 is disposed on the sidewall portion B2 of the bottom cover BC. The second sub-portion SP2 extends and is bent from the first sub-portion P1 to cover a portion of the backlight unit BLU.

The first frame F1 is disposed to correspond to one side of the display panel PNL, at which the printed circuit board PCB is disposed. The second sub-portion SP2 of the first frame F1 may be positioned at the same plane as the second portion P2 to support the printed circuit board PCB when viewed in a cross-sectional view vertical to the direction in which the first frame F1 extends.

In at least one of the second, third, and fourth frames F2, F3, and F4, the second portion P2 has a projection shape, and the display panel PNL is placed on the second portion P2 with the projection shape. Accordingly, the display panel PNL may be easily held by the chassis frame CSF. However, the shape of the second portion P2 should not be limited to the projection shape as long as the display panel PNL is held by the second portion P2.

As described above, the display device according to the present exemplary embodiment includes the chassis frame CSF to hold the display panel PNL, and thus a top chassis may be omitted. Therefore, the thickness of the display device according to the present exemplary embodiment may be reduced by a thickness of the top chassis when compared to that of a conventional display device. In addition, since the width of the second sub-portion SP2 of the chassis frame CSF is reduced, the outer portion of the display panel PNL, i.e., a bezel of the display panel PNL, may be reduced. Thus, the display device may have a relatively large sized screen compared to that of the conventional display device.

In the present exemplary embodiment, the chassis frame CSF is provided to correspond to the entire sides of the display panel PNL, but it should not be limited thereto or thereby. That is, the chassis frame CSF may be provided to partially correspond to the sides of the display panel PNL.

Figure 4:
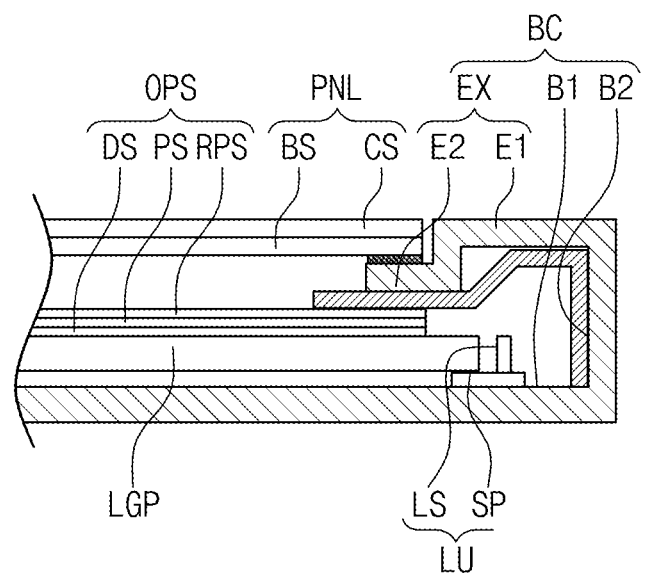
FIG. 4 is a cross-sectional view showing a display device according to another exemplary embodiment of the present disclosure.

FIG. 4 is a cross-sectional view showing a display device according to another exemplary embodiment of the present disclosure. In FIG. 4, the same reference numerals denote the same elements in FIGS. 1 to 3, and thus detailed descriptions of the same elements will be omitted.

Referring to FIG. 4, a bottom cover BC includes a bottom surface B1 facing the display panel PNL and accommodating a portion of the backlight unit BLU, including light source unit LU, and a sidewall portion B2 extending upward from the bottom surface B1. The bottom cover BC may further include an extension portion EX extending from the sidewall portion B2. The extension portion EX includes a first extension portion E1 bent and extending from the sidewall portion B2 to cover the portion of the backlight unit and a second extension portion E2 extending from the first extension portion E, on which the end portion of the display panel PNL is placed. The end portion of the display panel PNL may be at least a portion of a periphery or outer end of the display panel.

The second extension portion E2 has a projection shape, but the second extension portion E2 should not be limited to the projection shape as long as the second extension portion E2 supports the display panel PNL.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device, comprising:
a display panel comprising a base substrate and an opposite substrate disposed on the base substrate, the display panel having a rectangular shape defined by first and second long sides extending in a first direction and first and second short sides extending in a second direction substantially perpendicular to the first direction;
a printed circuit board disposed at a first long side of the display panel and electrically connected to the display panel;
a backlight unit configured to provide light to the display panel; a bottom cover that accommodates a portion of the backlight unit; and a chassis frame coupled to the bottom cover and supporting the display panel, the chassis frame comprising:
first and second frames extending in the first direction and respectively corresponding to the first and second long sides, and third and fourth frames extending in the second direction and respectively corresponding to the first and second short sides, each of the first to fourth frames comprising:
a first portion surrounding an outer portion of the bottom cover and overlapping the portion of the backlight unit, and
a second portion extending from the first portion, the display panel being disposed on the second portion, wherein:
the first portion comprises a first sub-portion and a second sub-portion bent from the first sub-portion, and the second sub-portion connected to the second portion;
each of the second sub-portions of the second to fourth frames is divided into a vertical part connected to the second portion and facing sides of the base substrate and the opposite substrate, and a horizontal part bent from the vertical part and connected to the first sub-portion; and an upper surface of the horizontal part is positioned at a same plane with an upper surface of the opposite substrate;

wherein the backlight unit comprises:

a light source configured to emit the light;

a light guide plate configured to guide the light emitted from the light source to the display panel;

at least one optical sheet disposed between the light guide plate and the display panel; and a reflection part disposed between the chassis frame and the bottom cover, overlapping the light source and portions of the light guide plate and the optical sheet, and configured to reflect the light; and wherein:

the bottom cover comprises a bottom surface on which the portion of the backlight unit is disposed, a sidewall portion extending upward from the bottom surface, and a rear surface opposite the bottom surface; and a portion of the reflection part is disposed between the side wall portion and the first sub-portions of the first to fourth frames.

2. The display device of claim 1, wherein:

the second portion of the first frame and the second sub-portion of the first frame are positioned at a same plane; and the printed circuit board is placed on the first portion of the first frame.

3. The display device of claim 2, further comprising a cover member disposed on the printed circuit board and covering the printed circuit board, wherein the cover member does not overlap the opposite substrate.

4. The display device of claim 3, wherein the bottom cover further comprises a groove disposed in the rear surface along an end portion of the bottom cover.

5. The display device of claim 4, wherein the chassis frame is disposed between the display panel and the backlight unit and overlaps the light source and the reflection part, and the portions of the light guide plate and the optical sheet.

6. The display device of claim 5, wherein the first sub-portion is disposed on the sidewall portion and the second sub-portion overlaps the portion of the backlight unit.

7. The display device of claim 6, wherein the chassis frame further comprises a hook disposed in an end portion of the first sub-portion and configured to engage with the groove.

8. The display device of claim 7, wherein the chassis frame has a rectangular ring shape corresponding to the periphery portion of the display panel.

9. The display device of claim 8, wherein at least one of the second, third, and fourth frames comprise the second portion and the second portion projects towards the inside of the display.

10. The display device of claim 1, further comprising a fixing member disposed between the display panel and the second portion, the fixing member coupling the display panel and the chassis frame.

\* \* \* \* \*